United States Patent [19]

Simon et al.

[11] Patent Number: 4,668,067
[45] Date of Patent: May 26, 1987

[54] PHOTOGRAPHIC SHUTTER

[75] Inventors: Horst Simon, Fellbach; Heinrich Killguss, Kornwestheim; Otto Wisst, Grunbach, all of Fed. Rep. of Germany

[73] Assignee: Eastman Kodak Company, Rochester, N.Y.

[21] Appl. No.: 902,730

[22] Filed: Sep. 2, 1986

[30] Foreign Application Priority Data

Oct. 5, 1985 [DE] Fed. Rep. of Germany ....... 3535703

[51] Int. Cl.$^4$ ............................. G03B 9/40; G03B 9/16
[52] U.S. Cl. .................................... 354/246; 354/248; 354/250
[58] Field of Search ............... 354/246, 247, 248, 250, 354/251, 228

[56] References Cited

U.S. PATENT DOCUMENTS 3,718,075  2/1973  Fuller .................................. 354/251
4,515,457  5/1985  Harvey ................................ 354/228

FOREIGN PATENT DOCUMENTS 474532  4/1929  Fed. Rep. of Germany .
169548  4/1951  Fed. Rep. of Germany ...... 354/249

Primary Examiner—A. A. Mathews
Attorney, Agent, or Firm—Roger A. Fields

[57] ABSTRACT

In a photographic shutter, an opening blade and a closing blade are settable in respective tensioned positions from which the blades can be released to first uncover and then recover an exposure opening. A cam device is mounted for unidirectional rotation to release the blades from their tensioned positions and to reset the blades to such positions. The cam device has an arcuate camming surface which extends spirally about the axis of the cam device from an area of minimum radius to an area of maximum radius as the cam device is rotated. A step-like surface of the cam device connects the areas of maximum and minimum radii to cause an abrupt drop from the maximum radius area to the minimum radius area. Respective springs urge the opening and closing blades against the camming surface. This causes each blade to be released from its tensioned position to drop from the maximum radius area to the minimum radius area when the maximum radius area moves out of the way of the blade, and causes each blade to be reset to its tensioned position when the maximum radius area moves back to the blade.

4 Claims, 3 Drawing Figures

PHOTOGRAPHIC SHUTTER

BACKGROUND OF THE INVENTION

1. Field of the Invention

The invention relates generally to the field of photographic cameras and in particular to a shutter mechanism for a camera.

2. Description of the Prior Art

A shutter consists of some means of covering a lens opening, uncovering it for a predetermined time and covering it up again. A large number of shutters include an opening (uncovering) blade and a closing (recovering) blade. Each of the blades is usually associated with a separate driving spring. The springs move the blades from respective tensioned positions to respective run-down positions, causing the lens opening to be uncovered and recovered. Typically, the driving springs and the blades are associated with a shutter tensioning and releasing device which operates to release the blades in their tensioned positions, to permit the springs to move the blades to their run-down positions, and operates to reset the blades to their tensioned positions.

SUMMARY OF THE INVENTION

The invention provides a simplified, yet improved photographic shutter. The shutter has an opening blade and a closing blade which are settable in respective tensioned positions from which the blades can be released to first uncover and then recover an exposure opening in a camera.

According to the invention, a cam device is mounted for unidirectional rotation to release the opening and closing blades from their tensioned positions and to reset the blades to such positions. The cam device has an arcuate camming surface which extends spirally about the axis of the cam device from an area of minimum radius to an area of maximum radius as the cam device is rotated. A step-like surface of the cam device connects the areas of maximum and minimum radii to cause an abrupt drop from the maximum radius area to the minimum radius area. Respective springs urge the opening and closing blades against the camming surface. This causes each blade to be released from its tensioned position to drop from the maximum radius area to the minimum radius area when the maximum radius area moves out of the way of the blade, and causes each blade to be reset to its tensioned position when the maximum radius area moves back to the blade.

DESCRIPTION OF THE PREFERRED EMBODIMENT

Figure 1:
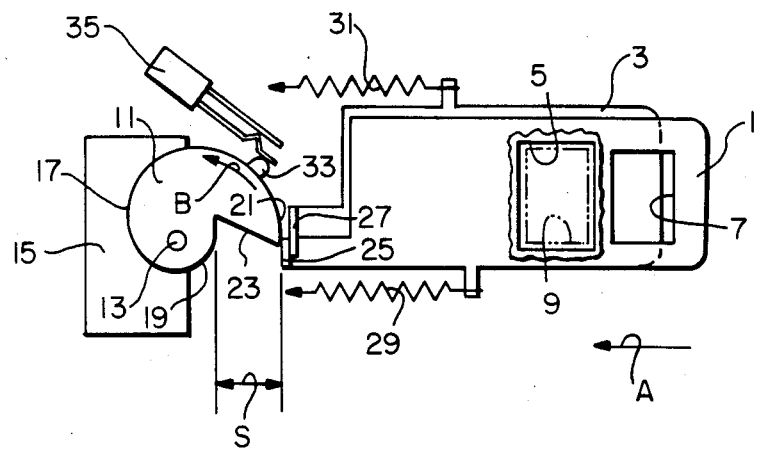
FIG. 1 is an elevational view of a shutter mechanism in accordance with a preferred embodiment of the invention.

The invention is disclosed as being embodied preferably in a still picture camera. Because the general features of this type of camera are well known, the description which follows is directed in particular to photographic elements forming part of or cooperating directly with the disclosed embodiment. It is understood, however, that other elements not specifically shown or described may take various forms known to persons of ordinary skill in the art.

In the type of camera to be described those photographic elements shown in the drawings will be assigned successive reference numbers. Other photographic elements not shown in the drawings are well known or conventional and will not be assigned any reference numbers. Thus, in the description which follows, the absence of a reference number in connection with a mentioned element indicates that such element is not shown in the drawings and is conventional or well known.

Referring now to FIG. 1 of the drawings, a shutter mechanism in a still picture camera includes an opening blade 1 and a closing blade 3 supported in parallel relation by appropriate guides for movement in the direction of an arrow A from respective tensioned or cocked positions to respective run-down positions. In their tensioned positions, shown in FIG. 1, the opening blade 1 covers an exposure opening 5 in the camera body and has an aperture 7 spaced from the exposure opening. The closing blade 3 has an aperture 9 substantially aligned with the exposure opening 5. In their run-down positions, the opening blade 1 has its aperture 7 substantially aligned with the exposure opening 5 and the closing blade 3 covers the exposure opening. Thus, to uncover and recover the exposure opening 5, the opening blade 1 is first moved from its tensioned position in the direction A to cause its aperture 7 to overlap in front of the exposure opening with the aperture 9 in the closing blade 3, and the closing blade is then moved from its tensioned position in the same direction to remove its aperture from the aperture in the opening blade.

A cam device 11 is mounted on a shaft 13 of a unidirectional motor 15 for rotation 360° in the direction of an arrow B each time a shutter release trigger on the camera body is manually actuated. As shown in FIG. 1, the cam device 11 has an arcuate camming surface 17 which is disposed in the rectilinear path of movement of the opening and closing blades 1 and 3. The camming surface 17 extends spirally about the axis of rotation of the cam device 11 from a minimum radius area 19 of the camming surface to a maximum radius area 21 of the camming surface as the cam device is rotated by the motor 15 in the direction B. A step-like surface 23 of the cam device 11 connects the maximum and minimum radii areas 21 and 19 of the camming surface 17 to cause an abrupt step or drop S from the maximum radius area to the minimum radius area. The height of the step S is approximately equal to the distance the opening and closing blades 1 and 3 must travel to move from their tensioned positions to their run-down positions.

When the cam device 11 is in its original position with the opening and closing blades 1 and 3 in their tensioned positions, as shown in FIG. 1, a tab 25 on the opening blade rests against the maximum radius area 21 of the camming surface 17 and a tab 27 on the closing blade rests against the tab 25. Respective helical tension springs 29 and 31 urge the opening and closing blades 1 and 3 to move in the direction A, into the curvilinear path of rotation of the camming surface 17, from their tensioned positions at the maximum radius area 21 of the camming surface 17 to their run-down positions at the minimum radius area 19 of the camming surface as the cam device 11 is rotated in the direction B. Thus, the maximum radius area 21 serves to releasably hold the opening and closing blades 1 and 3 in their tensioned positions and the minimum radius area 19 serves to limit movement of the blades in the direction A to their run-down positions.

In operation, the cam device 11 is rotated in the direction B, initially moving the maximum radius area 21 out of the way of the tab 25 on the opening blade 1. This allows the tension spring 29 to move the opening blade 1 the step S in the direction A from the maximum radius area 21 to the minimum radius area 19, causing the aperture 7 in the opening blade to overlap with the aperture 9 in the closing blade 3 to thereby uncover the exposure opening 5. At this time, the tab 27 on the closing blade 3 rests against the maximum radius area 21. When the maximum radius area 21 is moved out of the way of the tab 27, the tension spring 31 moves the closing blade 3 the step S to follow the opening blade 1, removing the aperture 9 in the closing blade from the aperture 7 in the opening blade to thereby recover the exposure opening 5. The step-like surface 23 which connects the maximum and minimum radii areas 21 and 19 is shaped to avoid blocking the tabs 25 and 27 as the opening and closing blades 1 and 3 are moved in the direction A.

When the opening and closing blades 1 and 3 are in their run-down positions, the tab 25 rests against the minimum radius area 19 and the tab 27 rests against the tab 25. Thus, further rotation of the cam device 11 in the direction B back to its original position, shown in FIG. 1, causes the camming surface 17 to jointly reset the blades to their tensioned positions.

A flash activating post 33 is provided for closing a flash energization switch 35 in proper synchronization with uncovering of the exposure opening 5. The post 33 is arranged on the camming surface 17 to avoid any contact with the tabs 25 and 27 of the opening and closing blades 1 and 3.

Figure 2:
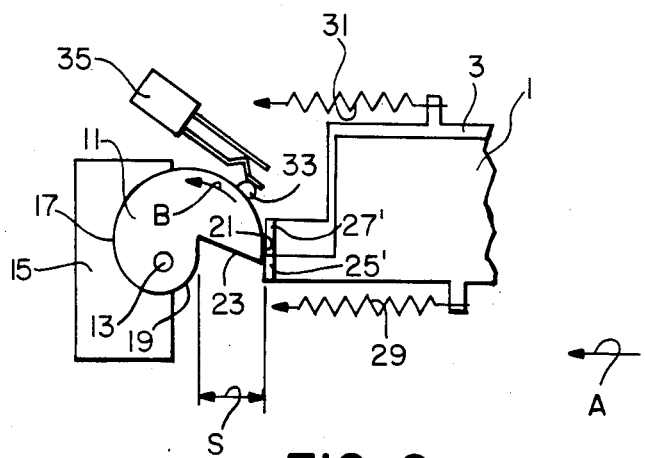
FIG. 2 is an elevational view of an alternate embodiment of the shutter mechanism.

FIG. 2 shows an alternate embodiment in which the tabs 25 and 27 of the opening and closing blades 1 and 3 in FIG. 1 are modified. In FIG. 2, the tabs 25' and 27' on the opening and closing blades 1 and 3 are disposed in co-planar relation to each rest against the maximum radius area 21 when the cam 11 is in its original position with the blades in their tensioned positions.

Figure 3:
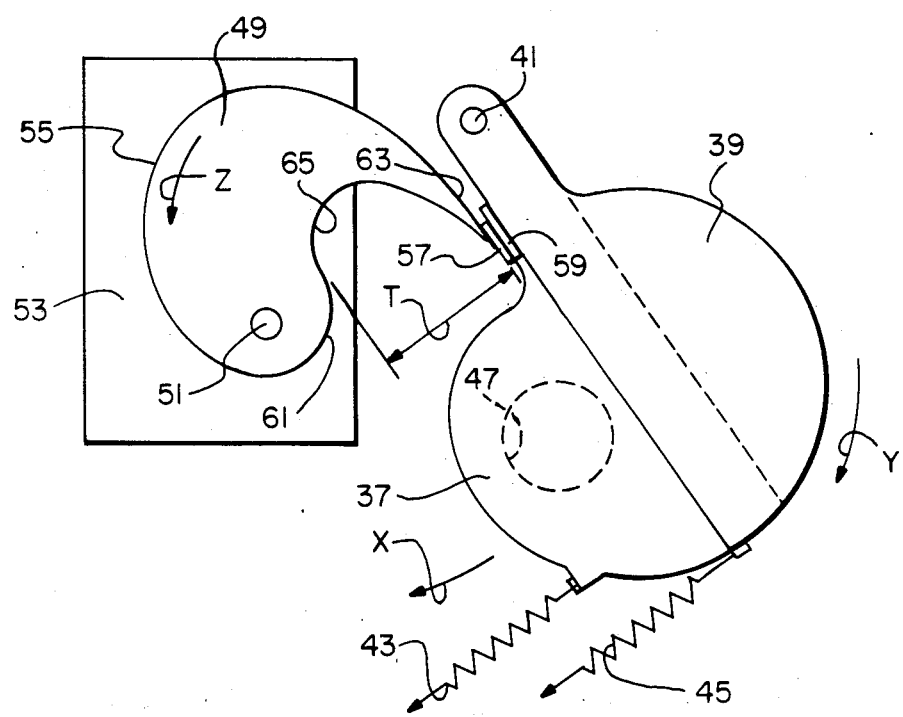
FIG. 3 is an elevational view of another embodiment of the shutter mechanism.

FIG. 3 shows an alternate embodiment in which an opening blade 37 and a closing blade 39 are supported for pivotal movement on a pivot pin 41. Helical tension springs 43 and 45 urge the opening and closing blades 37 and 39 to pivot in the directions indicated by arrows X and Y from respective tensioned positions to respective run-down positions. In their tensioned positions, the opening and closing blades 37 and 39 overlap with only the opening blade covering an exposure opening 47. In their run-down positions, the opening and closing blades overlap with only the closing blade covering the exposure opening.

A cam device 49 is mounted on a shaft 51 of a unidirectional motor 53 for rotation 360° in the direction of an arrow Z each time a shutter trigger is manually actuated. The cam device 49 has an arcuate camming surface 55 which, as shown in FIG. 3, normally abuts a tab 57 of the opening blade 37. In turn, the tab 57 of the opening blade 37 abuts a tab 59 of the closing blade 39. The camming surface 55 extends spirally about the axis of rotation of the cam device 49 from a minimum radius area 61 of the camming surface to a maximum radius area 63 of the camming surface as the cam device is rotated in the direction Z. A concave or recessed surface 65 of the cam device 49 connects the minimum and maximum radii areas 61 and 63 to cause an abrupt step or drop T from the maximum radius area to the minimum radius area. The step height of the T is approximately equal to the distance the opening and closing blades 37 and 39 must travel to move from their tensioned positions to their run-down positions.

In operation, the cam device 49 is rotated in the direction Z, initially moving the maximum radius area 63 out of the way of the tab 57 of the opening blade 37. This allows the tension spring 43 to pivot the opening blade 37 the step T in the direction X from the maximum radius area 63 to the minimum radius area 61, causing the opening blade to uncover the exposure opening 47. At this time, the tab 59 of the closing blade 39 rests against the maximum radius area 61. When the maximum radius area 63 is moved out of the way of the tab 59, the tension spring 45 pivots the closing blade 39 the step T to follow the opening blade 37, causing the closing blade to recover the exposure opening 47.

When the opening and closing blades 37 and 39 are in their run-down positions, the tab 57 rests against the minimum radius are 61 and the tab 59 rests against the tab 57. Thus, further rotation of the cam device 49 in the direction Z back to its original position, shown in FIG. 3, causes the camming surface 55 to jointly reset the blades to their tensioned positions.

The invention has been described with reference to preferred and alternate embodiments. However, it will be appreciated that variations and modifications can be effected within the ordinary skill in the art without departing from the scope of the invention.

We claim:

1. An improved photographic shutter of the type wherein an opening blade and a closing blade are settable in respective tensioned positions from which said blades can be released for movement to first uncover and then recover an exposure opening, and wherein the improvement comprises:

shutter tensioning and releasing cam means mounted for unidirectional rotation about an axis, said cam means having an arcuate camming surface which extends spirally about said axis from an area of minimum radius to an area of maximum radius as said camming surface is moved along a curvilinear path in the direction of rotation of said cam means and having a step-like surface which connects said areas of maximum and minimum radii to cause an abrupt drop from the maximum radius area to the minimum radius area; and means for urging said opening and closing blades into the curvilinear path of said camming surface for movement from said maximum radius area to said minimum radius area to cause each blade to be released from its tensioned position when the maximum radius area moves out of the way of the blade and to cause each blade to be reset to its tensioned position when said maximum radius area returns to the blade.

2. The improvement as recited in claim 1, wherein said urging means urges said opening and closing blades to move individually into contact with said maximum radius area of the camming surface to enable the blades to be released in succession from their tensioned positions.

3. The improvement as recited in claim 1, wherein said urging means urges said opening and closing blades to move radially with respect to said camming surface from said maximum radius area of the camming surface to said minimum radius area of the camming surface.

4. The improvement as recited in claim 3, wherein said minimum radius area of the camming surface is arranged to stop movement of said opening and closing blades after the blades uncover and recover said exposure opening.

* * * * *